United States Patent [19]

Lee et al.

[11] Patent Number: 5,605,961
[45] Date of Patent: Feb. 25, 1997

[54] THERMOPLASTIC COMPOSITION CONTAINING POLYURETHANE AND POLYPROPYLENE

[75] Inventors: Bin Lee, Coraopolis; H. Pielartzik; Robert J. Kumpf, both of Pittsburgh; Clifford J. Lau, Sewickley; Raymond A. Yourd; Jeffrey S. Wiggins, both of Pittsburgh, all of Pa.

[73] Assignee: Bayer Corporation, Pittsburgh, Pa.

[21] Appl. No.: 470,282

[22] Filed: Jun. 6, 1995

Related U.S. Application Data

[63] Continuation of Ser. No. 335,430, Nov. 7, 1994, abandoned, which is a continuation of Ser. No. 118,367, Sep. 8, 1993, abandoned.

[51] Int. Cl.$^6$ .................................................. C08L 77/00
[52] U.S. Cl. ................................. 525/66; 525/125
[58] Field of Search .................................. 525/66

[56] References Cited

U.S. PATENT DOCUMENTS

| | | | |
|---|---|---|---|
| 3,272,890 | 9/1966 | O'Leary, Jr. | 260/859 |
| 3,310,604 | 3/1967 | Steingiser et al. | 260/859 |
| 3,351,676 | 11/1967 | Saunders et al. | 260/859 |
| 3,358,052 | 12/1967 | Archer, Jr. et al. | 260/859 |
| 3,929,928 | 12/1975 | Wolf, Jr. et al. | 260/859 R |
| 4,410,595 | 10/1983 | Matsumoto et al. | 428/412 |
| 4,423,185 | 12/1983 | Matsumoto et al. | 525/66 |
| 4,429,076 | 1/1984 | Saito et al. | 525/57 |
| 4,883,837 | 11/1989 | Zabrocki | 525/66 |

FOREIGN PATENT DOCUMENTS 2170502  12/1985  United Kingdom.

OTHER PUBLICATIONS

Derwent Astract 24216V.
Polyurethane–Polypropylene Blends, Z. S. Petrovic et al in J. Appl. Sci. 42, 1991, p. 779.

*Primary Examiner*—Ana Woodward
*Attorney, Agent, or Firm*—Joseph C. Gil; Aron Preis

[57] ABSTRACT

A thermoplastic, resinous mixture, useful in the preparation of compatible blends of polyurethane with polyolefins, is disclosed. The mixture contains (i) a thermoplastic polyurethane, and
(ii) an agent which is the product of the reaction between a polyamide and a modified polyolefin.

The inventive mixture may be used as a component in thermoplastic molding compositions which contain a polyolefin, preferably polypropylene. Improved mechanical properties characterize the molding compositions thus prepared.

15 Claims, No Drawings

THERMOPLASTIC COMPOSITION CONTAINING POLYURETHANE AND POLYPROPYLENE

This application is a continuation of application Ser. No. 08/335,430 filed Nov. 7, 1994 now abandoned which is a continuation of Ser. No. 08/118,367 filed Sep. 8, 1993 (now abandoned.

FIELD OF THE INVENTION

This invention relates to thermoplastic compositions and is more particularly concerned with compatibilized blends of polypropylene with polyurethanes.

SUMMARY OF THE INVENTION

A thermoplastic, resinous mixture, useful in the preparation of compatible blends of polyurethane with polyolefins, is disclosed. The mixture contains (i) a thermoplastic polyurethane, and
(ii) an agent which is the product of the reaction between a polyamide and a modified polyolefin.

The inventive mixture may be used as a component in thermoplastic molding compositions which contain a polyolefin, preferably polypropylene. Improved mechanical properties characterize the molding compositions thus prepared.

BACKGROUND OF THE INVENTION

Thermoplastic polyurethane (herein TPU) and isotactic polypropylene (herein i-PP) are intrinsically incompatible, except at the lowest levels of incorporation of one resin in the other. It has been suggested that TPU/i-PP blends would offer advantages in terms of cost, hydrolytic and thermal stability, stain and solvent resistance mechanical properties and good adhesion to polyolefin substrates. Blends of these resins are typically delaminated and their mechanical properties are poor. Delamination in the present context means the separation of polymer blend into its components in a molded part. This is evidenced by either the lowering of some measured physical property to a value below that for either one of the components or by visual observation of separation (for instance, fracture or crumbling).

Relevant compositions were disclosed in the article "Polyurethane - Polypropylene Blends", Z.S. Petrovic et al in J. Appl. Polym. Set. 42, 1991 pp. 779; the preparation of these blends was noted to be difficult, especially for blends containing more than 3% polyurethane.

U.S. Pat. No. 3,272,890 discloses blends of polyurethane and polyethylene. The method of preparation of the blend entails melting and fluxing the polyethylene in a Banbury mixer and then adding the polyurethane. Systems containing dispersed polyethylene in polyurethane have been disclosed in U.S. Pat. Nos. 3,310,604; 3,351,676; and 3,358,052; other relevant blends having improved processability have been disclosed in U.S. Pat. No. 3,929,928.

U.S. Pat. Nos. 4,410,595 and 4,423,185 disclose compositions containing thermoplastic polyurethanes and polyolefins, the later being modified with functional groups including carboxylic acid anhydride. Japanese Pat. No. Application 74,9831 (Derwent Abstract 24216V) discloses modified ionomer polymer blends containing polyurethane and polyethylene.

Of particular relevance is U.S. Pat. No. 4,883,837 which disclosed compatible compositions containing a polyolefin, a thermoplastic polyurethane and as a compatibilizing agent, modified polyolefin. The modified polyolefin thus disclosed is an olefinic copolymer containing functional groups.

Instructively, the functional group is part of an unsaturated monomer which is either copolymerized with an olefin monomer or grafted onto a polyolefin to form the modified polyolefin.

It is a purpose of the present invention to provide a resinous mixture useful as a compatibilizing agent in the context of thermoplastic compositions containing polyolefins. It is further an object of the invention to provide compatible compositions containing TPU and polyolefin which compositions exhibit improved mechanical properties.

It is an additional purpose of the invention to provide for a means to produce a resinous mixture useful in the preparation of compatible TPU/polyolefin blends having improved mechanical properties.

It is a further purpose of the invention to provide a thermoplastic molding composition which contains a compatible blend of TPU with i-PP, or TPU with a blend of i-PP and an elastomer (herein TPO), having improved mechanical properties.

DETAILED DESCRIPTION OF THE INVENTION

In accordance with the invention there is provided a thermoplastic, homogeneous resinous mixture containing about 1 to 99, preferably about 60 to 80 percent TPU, and about 99 to 1, preferably about 40 to 20 percent of an agent which is the product of a reaction between a polyamide and a modified polyolefin, the percents being relative to the weight of the resinous mixture.

The resinous mixture may be used to form compatibilized thermoplastic compositions which contain polyolefins, particularly polypropylene.

The thermoplastic polyurethanes which are suitable in the present invention include the ones which are based on polyester polyol or a polyether polyol and are substantially linear polymers and have thermoplastic processing characteristics. Typically these may be prepared from the reaction of an organic polyisocyanate, preferably a diisocyanate with a polyol composition which may contain a polycaprolactone polyol, or a polyester polyol and a chain extender. The thermoplastic polyurethane can be prepared by methods as disclosed in U.S. Pat. Nos. 3,214,411 and 4,376,834, the teachings of which are incorporated herein by reference. These materials are well known in the art and are readily available in commerce. Representative documents disclosing the preparation of TPU include Polyurethanes: Chemistry and Technology, Part II, Saunders and Frisch, 1964 pp 767 to 769, Interscience Publishers, New York, N.Y. and Polyurethane Handbook, Edited by G. Oertel 1985, pp 405 to 417, Hanser Publications, distributed in U.S.A. by Macmillan Publishing Co., Inc., New York, N.Y. Also relevant are U.S. Pat. Nos. 2,929,800; 2,948,691; 3,493,634; 3,620, 905; 3,642,964; 3,963,679; 4,131,6114; 4,169,196; Re 31,671; 4,245,081; 4,371,684; 4,379,904; 4,447,590; 4,523, 005; 4,621,113; and 4,631,329 the disclosures of which are incorporated herein by reference.

Essentially the TPU of the invention may be prepared from an organic diisocyanate, at least one polyester polyol, or polyether polyol (preferably diols) and at least one difunctional extender. It may be prepared by the prepolymer, quasiprepolymer, or one-shot methods in accordance with methods described in the relevant literature.

The TPU is further characterized in that it has a melt flow rate of at least 4, preferably at least 8, more preferably at least 10 and up to 40, preferably up to 35 and more preferably up to 30 g/10 min. Melt flow rates are determined according to ASTM D-1238.

The polyols which can be used are those conventionally employed in the art for the preparation of TPU elastomers. These have molecular weights (number average) falling in the range of 400 to 4,000, and, preferably 500 to 3,000. It is not unusual, and, in some cases, it can be advantageous to employ more than one such polyol. Exemplary of suitable polyols are polyester diols, polyether polyols, hydroxy-terminated polycarbonates, hydroxy-terminated polybutadienes, hydroxy-terminated polybutadiene-acrylonitrile copolymers and hydroxy-terminated copolymers of dialkyl siloxane and mixtures in which any of the above polyols are employed as a major component (greater than 50% w/w) with polyether polyols or amine-terminated polyethers and amine-terminated polybutadiene acrylonitrile copolymers.

Illustrative of polyester polyols are those prepared by polymerizing ε-caprolactone using an initiator such as ethylene glycol, ethanolamine and the like, and those prepared by esterification of polycarboxylic acids such as phthalic, terephthalic, succinic, glutaric, adipic azelaic and the like acids with polyhydric alcohols such as ethylene glycol, butanediol, cyclohexanedimethanol and the like.

Particularly useful polyester polyols are those produced from divalent carboxylic acids or the anhydrides of these acids and a glycol having at, least, one, preferably two primary hydroxyl groups. Suitable divalent carboxylic acids include succinic acid, suberic acid, sebacic acid, oxalic acid, methyladipic acid, glutaric acid, pimelic acid, azelaic acid, phthalic acid, terephthalic acid, isophthalic acid and the like, and anhydrides of the above. Polyester polyols prepared from adipic acid are especially preferred.

By way of example, adipic acid is condensed with a suitable glycol or mixtures of glycols which have at least one primary hydroxyl group. The condensation is stopped when an acid number of from about 0.5 to about 2.0 is reached. The water formed during the reaction is simultaneously removed so that the final water content of the resulting product is from about 0.01 to about 0.02, preferably from about 0.01 to about 0.05 percent by weight.

Any suitable glycol may he used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethylpropylene glycol, 1,3-propylene glycol and the like. In addition to the glycols, a small amount of trihydric alcohol, up to about 1 percent may be used along with the glycols such as, for example, trimethylolpropane, glycerine, hexanetriol and the like. The molecular weight of the polyester polyol can he increased if desired by further reacting with an oxirane such as, for example, ethylene oxide or propylene oxide.

The suitable polyether polyols include polyoxyethylene glycols, polyoxypropylene glycols, copolymers of ethylene oxide and propylene oxide, polytertramethylene glycols, copolymers of tetrahydrofuran and ethylene oxide and/or propylene oxide. The preferred polyether polyols are copolymers of ethylene and propylene oxide.

The preferred polyol has a molecular weight of at least 500, more preferably at least 1250, and most preferably at least 2000, but less than 20,000, preferably less than 10,000 and more preferably less than 8000. The functionality of the polyol, number of isocyanate-reactive hydrogens per molecule, is preferably not greater than 6, and more preferably, the functionality is in the range of 2 to 4.

Any of the organic polyisocyanates and diisocyanates employed in the preparation of polyurethanes can be employed in preparing the TPU of the present invention. Illustrative of such isocyanates are; methylene bis(phenylisocyanates) including the 4,4'-isomer, the 2,4'-isomer and mixtures thereof, meta- and paraphenylene diisocyanates, chlorophenylene diisocyanates, α,α'-xylylene diisocyanate, 2,4- and 2,6-toluene diisocyanate and mixtures of these latter two isomers which are available commercially, toluene diisocyanate, hexamethylene diisocyanate, 1,5-naphthalene diisocyanate, isophorone diisocyanate and methylene bis-(cyclohexylisocyanate), including the 4,4'-isomer and 2,4'-isomer, and mixtures thereof.

Preferably, the organic polyisocyanate employed to prepare the TPUs useful in this invention is methylene bis(phenylisocyanate) in the form of the 4,4'-isomer as well as mixtures of the 4,4'- isomer with amounts ( up to about 70 percent by weight) of the 2,4'-isomer and modified forms of these diisocyanates. By the latter are meant those forms of methylene bis(phenylisocyanate) which have been treated to render them stable liquids at ambient temperature. Such products include those which have been reacted with a minor amount (up to 0.2 equivalents per equivalent of a polyphenyl polyisocyanate) of an aliphatic glycol or mixture of aliphatic glycols; such modified methylene bis(phenyl-isocyanates) are described in U.S. Pat. Nos. 3,394,164; 3,883,571; 4,115,429; 4,118,411 and 4,299,347; and those wherein a minor amount of the diisocyanate has been converted to the corresponding carbodiimide as described in U.S. Pat. No. 3,384,653. Mixtures of the above-described polyisocyanates can be employed if desired. The preferred organic diisocyanates include the aromatic and cycloaliphatic diisocyanates. Most preferred are methylenebis (phenylisocyanate) including the 4,4'-isomer, the 2,4'-isomer, and mixtures thereof, and methylenebis(cyclohexyl isocyanate) inclusive of the isomers described above.

The difunctional extender employed can be any of those known in the TPU art disclosed above. Typically the extenders can be aliphatic straight and branched chain diols having, g from 2 to 10 carbon atoms, inclusive, in the chain. Illustrative of such diols are ethylene glycol 1,3-propanediol, 1,4-butanediol, 1,5-pentanediol, 1,6-hexanediol, neopentyl glycol, and the like; 1,4-cyclohexanedimethanol; hydroquinone bis-(hydroxyethyl)ether; cyclohexylene diols (1,4-, 1,3-, and 1,2-isomers), isopropylidenebis(cyclohexanols); diethylene glycol, dipropylene glycol, ethanolamine, N-methyldiethanolamine, and the like; and mixture of any of the above. As noted previously, in some cases minor proportions (less than about 20 equivalent percent) of the difunctional extender may be replaced by trifunctional extenders without detracting from the thermoplasticity of the resulting TPU; illustrative of such extenders are glycerol, trimethylolpropane and the like.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, and diethylene glycol, either alone or in admixture with each other or with one or more aliphatic diols previously named. Particularly preferred diols are 1,4-butanediol, 1,6-hexanediol and 1,4-cyclohexanedi-methanol. Also included among the chain extenders which can he used in preparing TPU are adducts obtained by an aliphatic diol or triol such as 1,4-cyclohexane dimethanol, neopentyl glycol, hexane-1,2-diol, ethylene glycol, butane-1,4-diol, trimethylolpropane, and the like, with caprolactone in a mole ratio of from 0.01 to 2 moles of caprolactone per mole of diol or triol.

The equivalent proportions of polymeric diol to said extender can vary considerably depending on the desired hardness for the TPU product. Generally speaking, the proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

While any of the diol extenders described and exemplified above can be employed in preparing the thermoplastic polyurethane, alone, or in admixture, it is preferred to use 1,4-butanediol, neopentyl glycol, 1,4-cyclohexane dimethanol, ethylene glycol and diethylene glycol either alone or in admixture with each other.

The TPU forming ingredients can be reacted in organic solvents but are preferably reacted in the absence of solvent by melt-extrusion at a temperature of from about 125° C. to about 250° C., preferably from about 160° C. to about 225° C.

Preferably, the chain extender and the polyol, each of which has been previously heated, are first mixed and the resulting mixture is mixed with the heated polyisocyanate. This method is preferred for the reason that the extender and the polyester will not react prior to the introduction of polyisocyanate and rapid mixing with the polyisocyanate is thus facilitated.

Advantageously, the rate of reaction may be increased by adding any suitable catalyst to the reaction mixture such as tertiary amines and the like set forth in U.S. Pat. Nos. 2,620,516; 2,621,166 and 2,729,618 all incorporated herein by reference. Any of the catalysts conventionally employed in the art to catalyze the reaction of an isocyanate with a reactive hydrogen containing compound can be employed for this purpose; see, for example, Saunders et al., Polyurethanes. Chemistry and Technology, Part I, Interscience, New York, 1963, pages 228–232; see also, Britain et al., J. Applied Polymer Science, 4, 207–211, 1960. Such catalysts include organic and inorganic acids salts of and organometallic derivatives of bismuth, lead, tin, iron, antimony, uranium, cadmium, cobalt, thorium, aluminum, mercury, zinc, nickel, cerium molybdenum, vanadium, copper, manganese and zirconium, as well as phosphines and tertiary organic amines. Representative organotin catalysts are stannous octoate, stannous octoate, dibutyltin dioctoate, dibutyltin dilaurate, and the like. Representative tertiary organic amine catalysts are triethylamine, triethylenediamine, N,N N',N'-tetramethylethylenediamine, N,N,N',N'-tetraethylethlenediamine, N-methylmorpholine, N-ethylmorpholine, N,N,N', N'-tetramethylguandine, N,N,N',N'-tetramethyl-13 butanediamine, N,N-dimethylethanolamine, N,N-diethylethanolamine-amine, and the like. The amount of catalyst employed is generally within the range of about 0.02 to about 2.0 percent by weight based on the total weight of the reactants.

Other techniques for the production of thermoplastic polyurethanes useful in the context of the present invention are disclosed in the text "Polyurethanes: Chemistry and Technology", Vol. 2, pp. 299–452 by J.H. Saunders and K.C. Frisch, Interscience Publishers, New York (1964) incorporated herein by reference.

The above and other thermoplastic polyurethanes such as disclosed in U.S. Pat. No. 2,621,166; 2,729,618; 3,214,411; 2,778,810 and 4,376,834, Canadian Pat. Nos. 754,233; 733, 577 and 842,325, all incorporated herein by reference, which are suitable in the context of the presently described invention, may be used to prepare the thermoplastic compositions of the present invention, The agent in the present context is the product of a reaction of a modified olefin with a polyamide as specified below:

(i) the modified olefin may be any of random, block, or graft olefin copolymer having In a main or side chain thereof a functional group such as carboxylic acid; $C_1$ to $C_8$ carboxylate ester such as carbomethoxy, carbethoxy, carbopropoxy, carbobutoxy, carbopentoxy, carbohexoxy, carboheptoxy, carboctoxy, and isomeric forms thereof; carboxylic acid anhydride; carboxylate salts formed from the neutralization of carboxylic acid group(s) with metal ions from Groups I, II, III, IV-A, and VIII of the periodic table, illustratively including sodium, potassium, lithium, magnesium, calcium, iron, nickel, zinc, and aluminum, and mixtures thereof; amide; epoxy; hydroxy; $C_2$ to $C_6$acyloxy such as acetoxy, propionyloxy, butyryloxy, and the like; wherein said functional group is part of an unsaturated monomer precursor which is either copolymerized with an olefin monomer or grafted onto a polyolefin to form the modified polyolefin.

(ii) the polyamide reactant is the condensation product of at least one $C_{4-40}$ dicarboxylic acid with one or more $C_{4-50}$ diamine. The diamine may optionally contain ether units. Preferably the reaction product entails equimolar reactants but excess amine may be used to yield a product having amine end groups. The polyamide may be described as nylon x,y or as nylon x,y,y' where x is an integer of 4–50 preferably 1–20, most preferably 1–10 and is determined from the number of carbon atoms in the diamine residue, and where y and y' independently are integers of 4 to 40, preferably 6–36 and are determined from the number of carbons in the acid residue.

Nylon 6,36 and Nylon 6,6,36 are the preferred embodiments. Further preferred is carboxylic acid anhydride as the functional group in (i) and maleic acid anhydride is most preferred.

The modified olefin may be readily prepared using the conventional techniques for polymerizing olefin monomers; see Preparative Methods of Polymer Chemistry, R. Sorenson and T. W. Campbell, 1961, Interscience Publishers, New York, N.Y. Examples of the basic olefin monomers for copolymerization with the functional group containing unsaturated monomers are ethylene, propylene, butylene, mixtures of ethylene/propylene, mixtures of ethylene/butylene, mixtures of propylene/butylene, mixtures of ethylene/ $C_3$ to $C_{12}$ $\alpha,\beta$-unsaturated alkene, and the like. Alternatively, these monomers or mixtures thereof are first polymerized to their corresponding polyolefins prior to grafting with said functional group containing monomers.

Importantly, the molecular weight of the olefin polymer is in the range of about 2,000 to 600,000, more preferably 3,000 to 300,000.

As illustrative embodiments of modified olefins in grafted form are those derived from the graft polymerization of any one of the vinyl functional group containing monomers set forth above (preferably maleic anhydride) onto any one of the olefin polymers (including polyethylene and polybutylene) but preferably polypropylene. The proportions of said grafted functional groups are preferably within the molar range of 0.005 to 5 percent, preferably, 1–2% relative to the weight of the olefin copolymer.

In one embodiment the polyamide reactant is Nylon 6,36 homopolymer (commercially available as Priadit 2053 from Unichema) which is a reaction product of high purity dimer fatty acids (DFA) and 1,6-hexamethylene diamine (HHDA). It conforms to

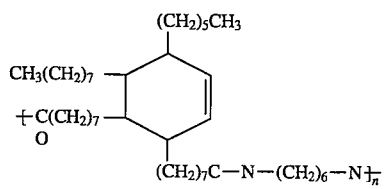

A preferred, modified, version of the above homopolymer entails added structural units which are derived from adipic acid (AA). A product thus based, available in commerce as Priadit 2054, is reported to have a composition of DFA 68%, HMDA 22 and AA 10%, the percents being relative to the weight of the product. The product, representing a particularly suitable compound of (ii) above has an amide concentration of 22.3 wt%, a melting point of 160° C., an amine number of 1.1 and an acid number of 0.3.

The agent may be prepared by reactive blending of a compound within (ii) above, for instance Nylon 6,36 with a compound within (i) for example carboxylic-acid grafted-polypropylene. The reactive blending may be carried out in a kneader or extruder or the like following procedures which are well known in the art.

In the reaction of (i) with (ii) the amino group at the chain end on the nylon and the anhydride or acid group in the modified polyolefin condense to form the corresponding imide or amic acid link. The resulting graft copolymer in a resinous mixture with TPU serves to compatibilize the TPU with polyolefin by assembling at the interface between these otherwise incompatible phases.

The optimal weight ratio between the reactants (ii) and (i), the amine content of the nylon component in (ii), the content of the functional groups in (i) and the molecular weight of the olefinic backbone are easily determined by routine experimentation.

Polypropylene, useful in preparing compatible thermoplastic compositions within the scope of the present invention, is well known in the art. All polypropylene resins, including atactic and syndiotactic polypropylene are suitable, including blends of polypropylene with elastomers—commonly referred to as TPO's. While the invention is specifically directed to compositions containing polypropylene and/or TPO's, it is expected that the compatibilizing effect would work as well in corresponding blends which contain polyolefins generally, including polyethylene (including high density polyethylene, low density polyethylene, linear low density polyethylene) polybutylene and their copolymers were used in partial or total substitution of polypropylene.

The preparation of the inventive blends of the present invention may be carried out conventionally. For instance, the components may be first dry-blended followed by fluxing the mixture in any of the known means for dry-blending and/or melt-compounding solids. The blends must be completely melted in the molding operation. Illustratively, the components in pelletized form can be brought together and dry-blended using conventional means such including a barrel or tumble mixer, rubber mill, Henschel mixer, Danbury mixer, and the like. The components may then be compounded in an appropriate melt-extruder, or the like. The mixing and melt-blending may be carried out in one step by bringing the components together directly in a melt-compounding apparatus (for instance, single or twin-screw extruders) and by producing strands which may then be chopped, pelletized, or otherwise comminuted prior to any subsequent molding steps. While the compounding or fluxing temperature is not critical, its is necessary that the three components be fused together but not thermally degraded. Advantageously, the blending may be carried out at about 125 to about 325° C., preferably from about 150° to about 250° C.

If desired, the compositions of the invention may have incorporated in them, at any appropriate stage of preparation, additives such as pigments, fillers, mold release agents, lubricants, stabilizers, antioxidants, coloring agents, fire retardants, and the like, which are commonly used in conjunction with polyurethane elastomers.

The invention is further illustrated but is not intended to be limited by the following examples in which all parts and percentages are by weight unless otherwise specified.

EXAMPLES

Example 1

Resinous mixtures in accordance with the invention were prepared and their efficacy in compatibilizing compositions containing polyolefins was determined.

An agent was first prepared by reacting at 230° C. 25 wt.% of Priadit 2054 resin (Nylon 6,6,36) with 75 wt.% of Polybond 3001 resin.

The resulting agent was blended with TPU and polypropylene in a Haake Kneader to form a thermoplastic molding composition and the properties of this composition were determined as shown in the table below. Also prepared and tested, following the same procedure, were corresponding comparative compositions. In all instances, except for Example A, the TPU (60 weight percent) was Texin 480-A, and the polypropylene (35 weight percent) was a polypropylene resin having a melt flow of about 12 g/10 min. In composition A, there was no third component included and the components were 60% Texin 480-A resin and 40% polypropylene. Composition "B" contained 5% of Polybond 3001, composition "C" contained 5% of Priadit 2054 and composition "D", representative of the compatibilized compositions of the invention contained the agent prepared as described above. The tensile properties—determined in accordance with ASTM D-412—of the several compositions are shown in the table below:

TABLE 1

|  | A | B | C | D |
| --- | --- | --- | --- | --- |
| Tensile strength (psi) | 504 | 829 | 1890 | 2715 |
| Elongation (%) | 206 | 252 | 413 | 465 |
| 100% modulus (psi) | 385 | 760 | 879 | 2143 |

The data clearly show that in TPU/polypropylene blends, the compatibilizer of the present invention is effective in imparting to the blend improved compatibility which is expressed in a higher level of mechanical properties.

Example 2

The reactants used in preparing several agents in accordance with the invention as described below were:
(a) Priadit 2054 and
(b) Polybond 3001 (a maleic anhydride grafted polypropylene) a product of BP Chemical, having a maleic anhydride content of about 0.5 wt % and a molecular weight of about 300,000, and
(c) Epolene E-43 is a modified polypropylene having a molecular weight of about 4500.

Product of reactions forming the agent of the invention were prepared by reactive blending at 220° C. Mixtures containing the resulting reaction product with TPU were prepared and these were used in the preparation of thermoplastic molding compositions containing polypropylene. The preparation of the molding compositions entailed blending the components at 230° C., for 10 minutes in a kneader.

The table below describes the several agents which differed one from the other in terms of the type of polypropylene and relative amounts of their components.

TABLE 2

| Agent 1 | 25% Priadit 2054, 75% PolyBond 3001 |
| Agent 2 | 50% Priadit 2054, 50% PolyBond 3001 |
| Agent 3 | 75% Priadit 2054, 25% PolyBond 3001. |
| Agent 4 | 75% Priadit 2054, 25% Epolene E-43 |
| Agent 5 | 50% Priadit 2054, 50% Epolene E-43 |

The table below summarizes the results of testings of the mechanical properties of compatibilized blends of TPU and polypropylene containing using the above mentioned compatibilizers:

TABLE 3

| Blend | | composition wt % | | Agent | | | | | elongation | Tensile strength |
| --- | --- | --- | --- | --- | --- | --- | --- | --- | --- | --- |
| TPU | PP | 1 | 2 | 3 | 4 | 5 | | | % | (psi) |
| 60 | 40 | | | | | | | | 206 | 504 |
| 60 | 35 | 5 | | | | | | | 465 | 2715 |
| 60 | 30 | 10 | | | | | | | 497 | 2781 |
| 60 | 35 | | 5 | | | | | | 154 | 1364 |
| 60 | 30 | | 10 | | | | | | 436 | 2473 |
| 60 | 25 | | 15 | | | | | | 405 | 2699 |
| 60 | 35 | | | 5 | | | | | 314 | 1772 |
| 60 | 30 | | | 10 | | | | | 489 | 2769 |
| 60 | 35 | | | | 5 | | | | 147 | 1993 |
| 60 | 30 | | | | 10 | | | | 352 | 2255 |
| 60 | 35 | | | | | 5 | | | 23 | 1617 |
| 60 | 30 | | | | | 10 | | | 39 | 1526 |

The TPU entailed in the examples is a polyester-polyol based thermoplastic polyurethane resin which is available from Miles Inc. under the trade mark Texin. The resinous mixtures of the invention impart improved mechanical properties to the blends as may be seen upon a comparison to the control blend which contains no agent.

Example 3

The agent used in the preparation of the compositions described below is the reaction product of Polybond 3005 (a modified polypropylene containing about 2% maleic anhydride) with Priadit 2054 following the procedure noted above. The compatible compositions were then prepared by melt blending the components in a twin screw extruder at 200° C. The compositions contained 5% of the agent, the amount of the polypropylene is noted and the balance in each composition is Texin 480-A resin.

TABLE 4

| Example | a | b | c | d | e |
| --- | --- | --- | --- | --- | --- |
| Polypropylene content (%) | 15 | 20 | 25 | 30 | 35 |
| Hardness | 47 | 49 | 56 | 60 | 60 |
| Tensile strength (psi) | 6590 | 4205 | 3590 | 2729 | 2134 |
| elongation (%) | 626 | 526 | 499 | 374 | 449 |
| 100% modulus (psi) | 1789 | 1911 | 2159 | 2303 | 2273 |
| flexural modulus (psi) | 36 | 63 | 70 | 93 | 113 |
| density (gm/cm$^3$) | 1.12 | 1.09 | 1.09 | 1.06 | 1.05 |

Example 4

The compositions shown in Table 5, all contained 10 wt % of 1PU (Texin 480A resin) and were prepared by melt blending in a ZSK co-rotating twin screw extruder (Werner & Pfleiderer) at 180°–220° C. The evaluations of the compositions thus prepared enable comparisons between isotactic polypropylene and 1PO as blend components in a compatibilized molding compositions with TPU's. Agent "A" was made by reactive blending 75 wt % of Polybond 3005 with 25% Priadit 2054 in a twin screw extruder. Agent "B" was similarly made except that 25% Polybond were reacted with 75% of Priadit. The properties of the blends thus compatibilized were compared to a uncompatibilized composition containing 90/10 polyolefin/TPU (Texin 480A resin). The properties of these compositions are shown in Table 6.

TABLE 5

| | Polyolefin | Agent |
| --- | --- | --- |
| Control 1 | TPO, 90% | none |
| Control 2 | polypropylene, 90% | none |
| Blend 1 | TPO, 85% | A 5% |
| Blend 2 | polypropylene, 85% | A 5% |
| Blend 3 | TPO, 85% | B 5% |
| Blend 4 | polypropylene, 85% | B 5% |

TABLE 6

| | Control | | Blend | | | |
| --- | --- | --- | --- | --- | --- | --- |
| Example | 1 | 2 | 1 | 2 | 3 | 4 |
| melt flow (g/10 min) | 9.6 | 25.2 | 7.2 | 24.4 | 7.4 | 20.4 |
| Tensile break (psi) | 1449 | 1612 | 1932 | 1569 | 2428 | 2364 |
| elongation (%) | 149 | 143 | 336 | 268 | 366 | 392 |
| flexural modulus (psi) | 109.7 | 157 | 198 | 231.5 | 132.4 | 218.2 |
| Izod impact (ft.lb/in.) | 4.55 | 0.56 | 6.18 | 0.86 | 2.95 | 0.65 |

Example 5

Further compositions demonstrating the invention were made and their properties evaluated. The compositions were blended in a co-rotating twin screw extruder at 200° C.

The control composition contained 90% TPU and 10% polypropylene and the compatibilized blend contained 85% TPU, 10% polypropylene and 5% of agent A as described in Example 4 above. Two grades of TPU were used in the composition described below: Texin 480 A resin—a TPU elastomer based on polyester polyol—and Texin 985A—a TPU based on polyether polyol.

TABLE 7

|  | TPU grade | elongation (%) |
|---|---|---|
| Control 1 | 480A | 517 |
| Control 2 | 985A | 637 |
| Blend 1 | 480A | 536 |
| Blend 2 | 985A | 665 |

The elongation at break is greater for the compositions which contained the reaction product of the invention.

Example 6

Compositions in accordance with the formulations shown below were prepared in a co-rotating twin screw extruder and their properties evaluated.

The control composition contained 90% TPU (Texin 985-A resin) and 10% polypropylene and the compatibilized blend contained 85% TPU (Texin 985-A resin), 10% polypropylene, and 5% of Agent A or Agent B as described in Example 4 above.

The properties are shown in the table below:

TABLE 8

|  | Agent | tensile break (psi) | flexural modulus (psi) |
|---|---|---|---|
| Control 1 | none | 2934 | 7032 |
| Blend 1 | A | 6111 | 10980 |
| Blend 2 | B | 4455 | 9669 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What claimed is:

1. A resinous homogeneous thermoplastic composition comprising (a) a first polyolefin selected from the group consisting of isotactic polypropylene, syndiotactic polypropylene and TPO and (b) a mixture of about 1 to 99% thermoplastic polyurethane and 1 to 99% of an agent, said percents being relative to the weight of said mixture, said agent comprising the product of a reaction of reactant (i) and reactant (ii) wherein (i) is a modified polyolefin having a molecular weight of about 2,000 to 600,000, selected from the group consisting of homopolymers, random and block copolymers said group polymerized from olefin monomers selected from the group consisting of ethylene, propylene, butylene and mixtures thereof, and mixtures of ethylene/$C_{3-12}\alpha,\beta$unsaturated alkenes characterized in having in a main or side chain thereof a functional group selected from the group consisting of carboxylic acid; $C_{1-8}$-carboxylate ester; carboxylic acid anhydride; carboxylate salts formed from the neutralization of carboxylic acid group(s) with metal ions from Groups I, II, III, IV-A and VIII of the periodic table; amide; epoxy; hydroxy; and $C_{2-6}$-acyloxy; wherein said functional group is part of an unsaturated monomer precursor which is either copolymerized with an olefin monomer or grafted onto a polyolefin to form said modified polyolefin, and where said functional group is present in the molar range of 0,005 to 5 percent relative to the weight of said modified polyolefin, and wherein (ii) is a polyamide resin which is a condensation product of one or more $C_{4-40}$-dicarboxylic acid with one or more $C_{4-50}$-diamine, said first polyolefin excluding said modified polyolefin.

2. The composition of claim 1 wherein said first polyolefin is isotactic polypropylene.

3. The composition of claim 1 wherein said first polyolefin is syndiotactic polypropylene.

4. The composition of claim 1 wherein said first polyolefin is TPO.

5. The composition of claim 1 wherein said polyamide is nylon x,y where x is an integer of 4 to 20 and y is an integer of 4 to 40.

6. The composition of claim 1 wherein said polyamide is nylon x,y,y' wherein x is an integer of 4 to 20 and y is an integer of 4 to 40 and y' is 36.

7. The composition of claim 1 wherein said thermoplastic polyurethane is present in an amount of about 60 to 80% and wherein said agent is present in an amount of about 40 to 20% said percents being relative to the weight of said mixture.

8. The composition of claim 1 wherein said functional group is carboxylic acid anhydride.

9. The composition of claim 8 wherein said anhydride is maleic acid anhydride.

10. The composition of claim 1 wherein molecular weight is about 3,000 to 300,000.

11. The composition of claim 1 wherein reaction entails equimolar reactants.

12. The composition of claim 1 wherein reaction entails excess reactant (ii).

13. The composition of claim 1 wherein thermoplastic polyurethane is based on a polyester polyol.

14. The composition of claim 1 wherein thermoplastic polyurethane is based on a polyether polyol.

15. A resinous homogeneous thermoplastic composition comprising (a) a first polyolefin selected from the group consisting of isotactic polypropylene, syndiotactic polypropylene and TPO and (b) a mixture of about 60 to 80% thermoplastic polyurethane and 40 to 20% of an agent, said percents being relative to the weight of said mixture, said agent comprising the product of a reaction of reactant (i) and reactant (ii) wherein (i) is a maleic anhydride grafted polypropylene having a molecular weight of about 2,000 to 300,000 having a maleic anhydride content of about 0.5% relative to the weight of said grafted polypropylene, and wherein (ii) is a polyamide resin selected from the group consisting of nylon 6,36 and nylon 6,6,36, said first polyolefin excluding said modified polyolefin.

* * * * *